United States Patent
Ärlig et al.

(10) Patent No.: US 11,467,600 B2
(45) Date of Patent: Oct. 11, 2022

(54) PERIMETER MARKING FOR A ROBOTIC WORKING TOOL

(71) Applicant: Husqvarna AB, Huskvarna (SE)

(72) Inventors: Ulf Ärlig, Habo (SE); Ludvig Sjöholm, Gränna (SE)

(73) Assignee: HUSQVARNA AB, Huskvarna (SE)

( * ) Notice: Subject to any disclaimer, the term of this patent is extended or adjusted under 35 U.S.C. 154(b) by 436 days.

(21) Appl. No.: 16/497,876

(22) PCT Filed: Feb. 28, 2018

(86) PCT No.: PCT/SE2018/050187
§ 371 (c)(1),
(2) Date: Sep. 26, 2019

(87) PCT Pub. No.: WO2018/182478
PCT Pub. Date: Oct. 4, 2018

(65) Prior Publication Data
US 2020/0042011 A1 Feb. 6, 2020

(30) Foreign Application Priority Data
Mar. 28, 2017 (SE) .................................. 1750364-0

(51) Int. Cl.
*G05D 1/02* (2020.01)
*A01D 34/00* (2006.01)
*A01D 101/00* (2006.01)

(52) U.S. Cl.
CPC ......... *G05D 1/0265* (2013.01); *A01D 34/008* (2013.01); *A01D 2101/00* (2013.01); *G05D 2201/0208* (2013.01)

(58) Field of Classification Search
CPC .............. G05D 1/0265; A01D 34/008; A01D 2101/00; A01D 34/00
See application file for complete search history.

(56) References Cited

U.S. PATENT DOCUMENTS 6,300,737 B1 10/2001 Bergvall et al.
2005/0267629 A1* 12/2005 Petersson ............. G05D 1/0225
700/245
(Continued)

FOREIGN PATENT DOCUMENTS

CN 105467983 A 4/2016
EP 1512053 B1 5/2007
(Continued)

OTHER PUBLICATIONS

"Husqvarna Technical Manual—Automower", Husqvarna Article Husqvarna: "Husqvarna Technical Manual—Automower", Dec. 31, 2008, 120 Pages.
(Continued)

*Primary Examiner* — Brian P Sweeney
(74) *Attorney, Agent, or Firm* — Burr & Forman LLP (57) ABSTRACT

A robotic working tool comprising a sensor for detecting magnetic fields connected to a controller for controlling the operation of the robotic working tool. The controller is configured to operate according to a first control signal being transmitted through a first boundary wire and according to a second control signal being transmitted through a second boundary wire. The robotic working tool is thereby configured to operate within a composite work area comprising at least a first partial work area and a second partial work area. The first boundary wire delimits the first partial work area and the second boundary wire delimits the second partial work area. The at least first and second boundary wires provide a common perimeter for the composite work area. Analysing the magnetic fields detected by the sensor, the controller determines whether the robotic working tool is inside or outside the composite work area.

13 Claims, 8 Drawing Sheets

(56) References Cited

U.S. PATENT DOCUMENTS

2013/0041526 A1     2/2013   Ouyang
2016/0174459 A1     6/2016   Balutis et al.

FOREIGN PATENT DOCUMENTS

| EP | 1 906 205 A1 | 4/2008 | |
|----|---|---|---|
| SE | 510524 C2 | 5/1999 | |
| SE | 1100448 A1 | 10/2012 | |
| WO | 90/00274 A1 | 1/1990 | |
| WO | 99/38056 A1 | 7/1999 | |
| WO | 03104908 A1 | 12/2003 | |
| WO | 03104909 A1 | 12/2003 | |
| WO | WO 2003104909 A1 * | 12/2003 | ............. A01D 34/00 |
| WO | 2011115535 A1 | 9/2011 | |
| WO | 2016102142 A1 | 6/2016 | |

OTHER PUBLICATIONS

Search Report for Swedish Application No. 1750364-0 dated Nov. 1, 2017.
International Search Report and Written Opinion for International Application No. PCT/SE2018/050187 dated Aug. 27, 2018.
International Preliminary Report on Patentability for International Application No. PCT/SE2018/050187 dated Oct. 1, 2019.

* cited by examiner

PERIMETER MARKING FOR A ROBOTIC WORKING TOOL

TECHNICAL FIELD

This application relates to robotic working tools and in particular to a robotic working tool, a robotic working tool system, a computer readable medium and a method for improved perimeter marking by a robotic working tool, such as a lawnmower.

BACKGROUND

Figure 1:
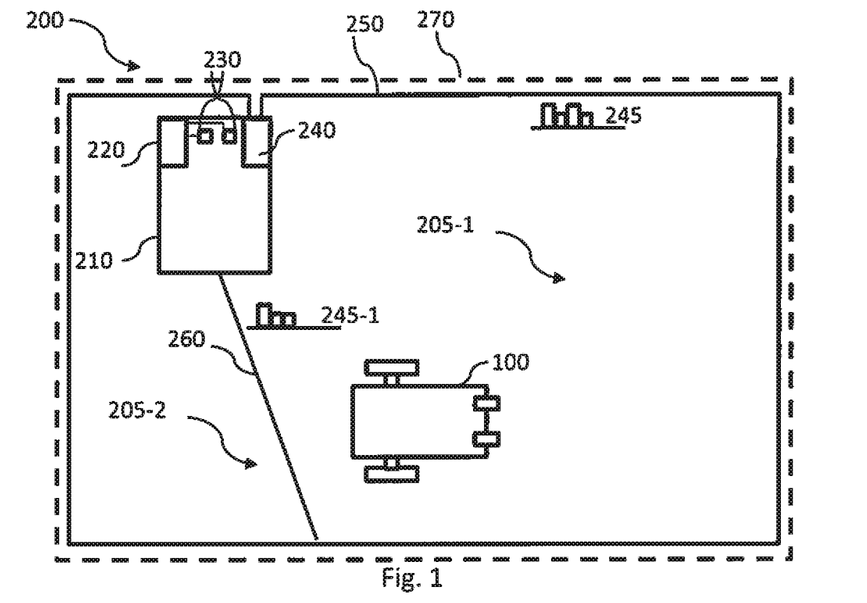
FIG. 1 shows an example of a robotic lawnmower system according to the prior art.

Automated or robotic power tools such as robotic lawnmowers are becoming increasingly more popular. In a typical deployment, as is depicted in FIG. 1 showing a traditional robotic working tool system, a robotic working tool 100 is set to operate in a work area 205 following its internal navigation routine. Traditionally the perimeter of this work area 205 is marked by a boundary wire 250 through which an electrical signal 245 is transmitted. As the signal travels through the boundary wire 250 it will generate a magnetic field around the boundary wire 250, which the robotic working tool 100 may detect using a magnetic field sensor, such as a coil with a magnetic core. In such an arrangement the robotic working tool 100 may be kept within the work area 205 by being programmed to turn as the magnetic field caused by the signal 245 is detected, either to exceed a threshold (indicating a closeness to the boundary wire) or to change polarity (indicating a cable crossing—or a combination of the two.

However, such systems have traditionally only been used with relatively small work areas, where multiple robotic systems are proposed for use with larger areas.

There is thus a need for a robotic working tool system that is able to service large areas without the added cost of using multiple systems.

SUMMARY

With regards to the system disclosed above with reference to FIG. 1, the inventors have realized and identified a number of problems, after inventive insight and reasoning, such as that some systems have replaced or supplemented the boundary wire perimeter marking by other perimeter marking systems such as using a preprogrammed map which is navigated using for example geolocational signals, such as GPS (Global Positioning Systems) or other GNSS (Global Navigation Satellite System). Such systems are basically only limited in size by the range of the robotic working tool 100 and their physical installation is very easy as no cable is needed. However, their programming might be rather difficult for every owner to perform depending on their computer skills and experience. Also, such systems are not able to navigate with high accuracy in some areas, such as where the satellite signals are blocked or obscured by for example trees or buildings. As many garden owners are rather proud of for example their flower beds accurate navigation is a high requirement as a navigational error of only a few centimeters may cause harm to a flower bed.

To safe guard, many such systems rely on a combination of geolocational signals and a boundary wire 250 for establishing a firm perimeter. This, of course, adds to the cost of the system.

However, there is a drawback that the inventors have realized—to using a boundary wire in that the capacitance to the ground, i.e. between the boundary wire and the physical ground, increases with the length of the boundary wire 250 and puts a practical maximum length to the cable in the order of 800 meters. A square having a side of 200 meters would thus represent a maximum squared work area that could be serviced by any robotic working tool operating using boundary wires 250. As this area is only 40.000 sqm this sets a practical limitation to the use of robotic working tools to gardens and for larger areas such as golf fields, landing strips, sports fields to name a few examples, the owner would have to rely on multiple systems thereby increasing his cost significantly. For example, the contemporary high-end robotic lawnmower Ambrogio L400 which is aimed for operating in larger areas is limited to areas of 10,000 sqm or 20,000 sqm if the GPS module is purchased. As the price of this model is around 10.000 € having to buy more than one system constitutes a significant investment.

It is therefore an object of the teachings of this application to overcome or at least reduce those problems and problems discussed above and below by providing a composite work area, comprising partial work areas, each partial work area being delimited by its own boundary wire.

This is different from having additional cables within a work area as they are still ultimately bounded by the same boundary wire thus still suffering from the drawbacks of the prior art.

This is also different from splicing boundary wires in series to provide for a longer boundary wire, as the longer boundary wire, consisting of several spliced wires, will also suffer from the drawbacks of the prior art.

This is a very simple solution to a long standing problem, that in some embodiments require only a minimum of modification to the contemporary robotic working tools. As using multiple bwires have been known since the start of this millennia, and the problem of the capacitance between wire and ground is based on a physical phenomena, and that large fields such as golf fields have been cut for decades, if not centuries, the problem has existed for definitely more than 7 years.

The inventors have thus provided a highly simple and elegant solution to a long-standing problem as per the teachings herein by providing a robotic working tool system operating with more than pone boundary wire for providing an extended work area, beyond what is possible using a single boundary wire and without using a plurality of robotic working tool systems.

It is thus an object of the teachings of this application to overcome the problems by providing a robotic working tool comprising a sensor for detecting magnetic fields connected to a controller for controlling the operation of the robotic working tool, the controller further being configured to: operate according to a first control signal being transmitted through a first boundary wire and operate according to a second control signal being transmitted through a second boundary wire, the robotic working tool thereby being configured to operate within a composite work area comprising at least a first partial work area and a second partial work area, wherein the first boundary wire delimits the first partial work area and the second boundary wire delimits the second partial work area, the at least first and second boundary wires providing a common perimeter for the composite work area.

It is also an object of the teachings of this application to overcome the problems by providing a robotic working tool system comprising a robotic working tool, a first boundary wire and a second boundary wire, wherein said robotic working tool is configured to operate in a composite work area, comprising a first partial work area delimited by the first boundary wire and a second partial work area delimited by the second boundary wire.

It is also an object of the teachings of this application to overcome the problems by providing a method for use in a robotic working tool system comprising a robotic working tool, a first boundary wire and a second boundary wire, said method comprising providing a composite work area delimited by the first and second boundary wire by delimiting a first partial work area with said first boundary wire, delimiting said second partial work area with said second boundary wire, arranging the first partial work area adjacent the second partial work area thereby forming the composite work area and operating the robotic working tool inside the composite work area comprising said first and second partial work areas.

It is also an object of the teachings of this application to overcome the problems by providing a method for use in a robotic working tool robotic working tool comprising a sensor for detecting magnetic fields, the method comprising: operating the robotic working tool according to a first control signal being transmitted through a first boundary wire and operating the robotic working tool according to a second control signal being transmitted through a second boundary wire, the robotic working tool thereby being configured to operating the robotic working tool within a composite work area comprising at least a first partial work area and a second partial work area, wherein the first boundary wire delimits the first partial work area and the second boundary wire delimits the second partial work area, the at least first and second boundary wires providing a common perimeter for the composite work area.

It is also an object of the teachings of this application to overcome the problems by providing a signal generator configured to be used in a system as herein.

It is also an object of the teachings of this application to overcome the problems by providing a computer readable medium for carrying computer instructions that when loaded into a controller of a robotic working tool or robotic working tool system, causes the robotic working tool or robotic working tool system to operate according to a method as above and herein.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that all indications of rotational speeds, time durations, work loads, battery levels, operational levels etc. are given as examples and may be varied in many different ways as would be apparent to a skilled person. The variations may be for individual entities as well as for groups of entities and may be absolute or relative.

Returning to FIG. 1 showing a schematic view of a robotic working tool system 200. The schematic view is not to scale. Although FIG. 1 is aimed to show an example of prior art systems, the components of such a system are common to a system of the teachings according herein and the differences will be detailed with reference to FIGS. 2A, 2B and 3.

As stated in the background section, the robotic working tool system 200 comprises a charging station 210 and a boundary wire or cable 250 arranged to enclose a work area 205, in which the robotic lawnmower 100 is supposed to operate.

The robotic working tool 100 is exemplified by a robotic lawnmower, but the teachings herein may also be applied to other robotic working tools adapted to operate within a work area.

The charging station 210 has a charger 220, in this embodiment coupled to two charging plates 230. The charging plates 230 are arranged to cooperate with corresponding charging plates (not shown) of the robotic lawnmower 100 for charging a battery (referenced 180 in FIG. 2B) of the robotic lawnmower 100.

The charging station 210 also has, or may be coupled to, a signal generator 240 for providing a control signal 245 to be transmitted through the boundary wire 250. The signal generator thus comprises a controller for generating the control signal.

In one embodiment the control signal 245 comprises an alternating current, such as a continuously or regularly repeated current signal. The control signal may be a CDMA signal (CDMA—Code Division Multiple Access). The control signal may also or alternatively be a pulsed control signal, the control signal thus comprising one or more current pulses being transmitted periodically. The control signal 245 may also or alternatively be a continuous sinusoidal wave.

As is known in the art, the current signal will generate a magnetic field around the boundary wire 250 which sensors (referenced 170 in FIG. 2B) of the robotic lawnmower 100 will detect.

For the context of this application detecting a signal will include, but not be limited, detecting the magnetic field generated by the signal as it travels through a wire by receiving the voltages generated by the sensor as it is exposed to the magnetic field and processing these voltages in order to identify them as having been generated by the signal. For example a pulsed signal will give rise to a series of voltage flanks that may be identified as corresponding to the pulsed signal, by the flanks relative time distances.

As the robotic lawnmower 100 (or more accurately, the sensor 170) crosses the boundary wire 250 the direction of the magnetic field will change. The robotic lawnmower 100 will thus be able to determine that the boundary wire has been crossed, and take appropriate action by controlling the driving of the rear wheels 130" to cause the robotic lawnmower 100 to reverse or turn a certain angular amount and return into the work area 205. For its operation within the work area 205, in the embodiment of FIG. 1, the robotic lawnmower 100 may alternatively or additionally use the satellite navigation device (referenced 190 in FIG. 28), possibly supported by a deduced reckoning navigation sensor (referenced 195 in FIG. 28) to navigate the work area 205. The perimeter 270 of the work area is thus delimited by the boundary wire 250 possibly in combination with other navigational aids.

The robotic working tool system 200 may also comprise a further wire, such as a guide wire 260 for enabling the robotic working tool 100 to find the charging station more quickly (than having to randomly find it or simply follow the boundary wire 250). Such additional cables may also be utilized to divide the work area 205 into segments 205-1 and 205-2 of the work area 205. To enable the robotic working tool 100 to differentiate the additional wire(s) 260 from the boundary wire, a different signal 245-1 may be transmitted through the additional wire(s) 260.

The European Patent published as EP1,512,053 B2 discloses an example of such a system, where a plurality of cables or wires are used to both guide the robotic lawnmower to the charging station, but also to divide the work area into smaller portions that can be serviced independently and at different times. A composite pulsed control signal is used, where a first pulse is transmitted through the boundary wire and subsequent pulses are transmitted through the individual wires. The robotic lawnmower is configured to be able to detect the first pulse in the whole area so that it is able to synchronise the detection of the subsequent pulses and based on this, the robotic lawnmower is able to determine which cable is detected by the time distance from the first pulse to the detected subsequent pulse. For further details on this, see for example FIGS. 1 and 2 of EP 1,512,053. This system thus only work if the control signal being transmitted through the boundary wire (as opposed to the additional wires) is detected by the robotic working tool, and the system thus suffer from the same drawbacks as discussed in the background section.

Figures 2A, 2B:
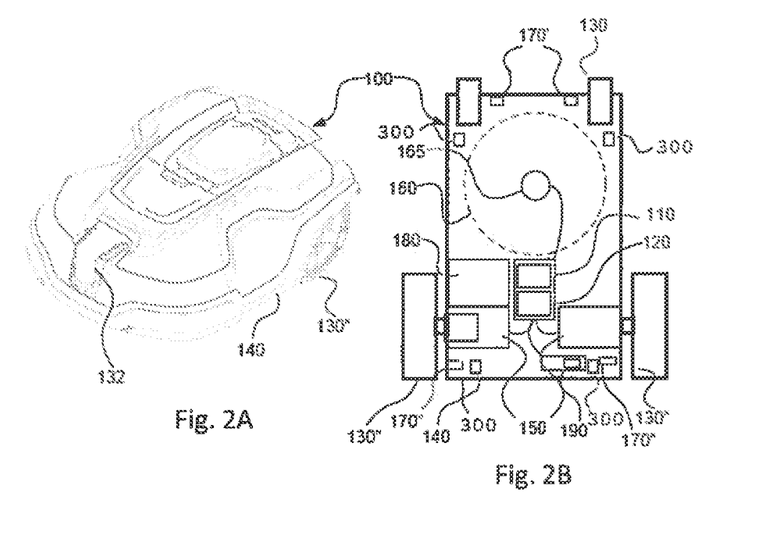
FIG. 2A shows an example of a robotic lawnmower according to an embodiment of the teachings herein.
FIG. 2B shows a schematic view of the components of art example of a robotic lawnmower according to an embodiment of the teachings herein.

FIG. 2A shows a perspective view of a robotic working tool 100, here exemplified by a robotic lawnmower 100, having a body comprising a cover 132 and a chassis 140 and a plurality of wheels 130 (only one shown). As can be seen, the robotic lawnmower 100 may comprise charging skids for contacting contact plates (not shown in FIG. 2A, but referenced 230 in FIG. 1) when docking into a charging station (not shown in FIG. 2A, but referenced 210 in FIGS. 1 and 3) for receiving a charging current through, and possibly also for transferring information by means of electrical communication between the charging station and the robotic lawnmower 100.

FIG. 2B shows a schematic overview of the robotic working tool 100, also exemplified here by a robotic lawnmower 100, having a chassis 140 and a plurality of wheels 130.

It should be noted that even though the description given herein will be focused on robotic lawnmowers, the teachings herein may also be applied to robotic cleaners such as robotic vacuum cleaners and/or robotic floor cleaners, robotic ball collectors, robotic mine sweepers, robotic farming equipment, o other robotic working tools to be employed in a work area defined by a boundary wire.

In the exemplary embodiment of FIG. 2B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 2B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further have at least one sensor 170; in the example of FIG. 2B there are four sensors divided into a first sensor pair 170' and a second sensor pair 170", respectively arranged at each wheel 130', 130" to detect a magnetic field (not shown) and for detecting a boundary wire and or for receiving (and possibly also sending) information from a signal generator 240. The sensors 170 may thus be arranged as front sensors 170' and rear sensors 170".

In some embodiments, the sensors 170 may be connected to the controller 110, and the controller 110 may be configured to process and evaluate any signals received from the sensor pairs 170, 170'. The sensor signals may be caused by the magnetic field being generated by a control signal being transmitted through a boundary wire. This enables the controller 110 to determine whether the robotic lawnmower 100 is close to or crossing a boundary wire 250, or inside or outside an area enclosed by the boundary wire 250. This also enables the robotic lawnmower 100 to receive (and possibly send) information from the control signal 245.

The robotic lawnmower 100 also comprises a grass cutting device 160, such as a rotating blade 160 driven by a cutter motor 165. The grass cutting device being an example of a work tool 160 for a robotic working tool 100. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

Figure 3:
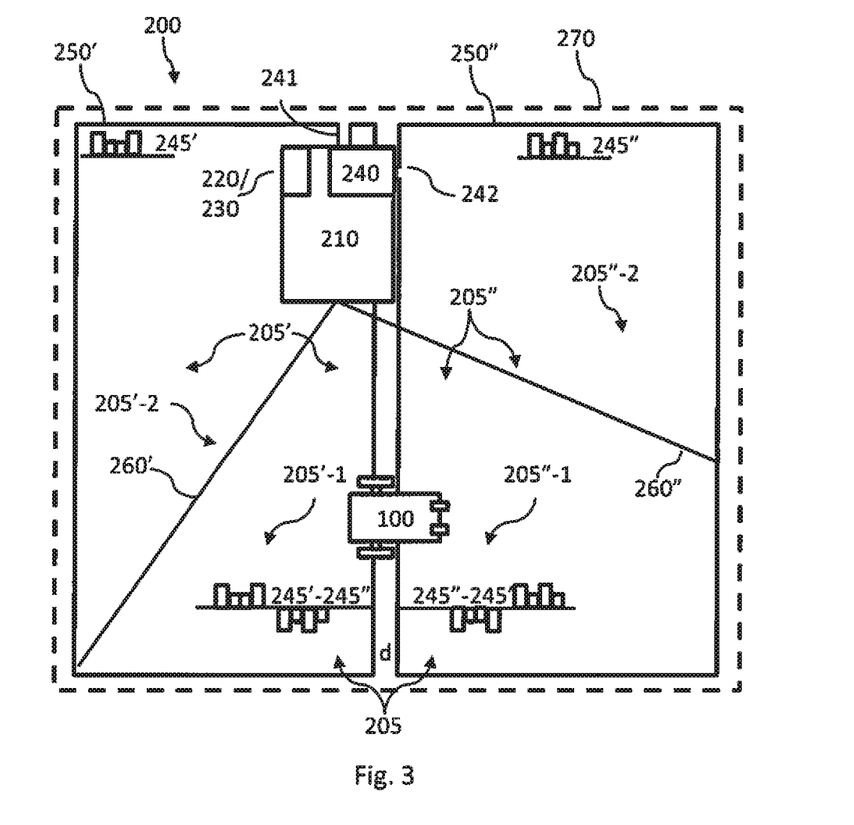
FIG. 3 shows an example of a robotic lawnmower system according to an embodiment of the teachings herein.

FIG. 3 shows a schematic view of a robotic working tool system 200 in one embodiment according to the teachings herein. It should be noted that the system according to the teachings include many of the components of the prior art system and for clarity's sake, some components will not be shown in FIG. 3, such as the charging plates 230 which are deemed to be included in the charger 220. The schematic view is not to scale. As in the prior art, the robotic working tool system 200 comprises a charging station 210 and a boundary wire 250 arranged to enclose a work area 205, in which the robotic lawnmower 100 is supposed to operate.

However, the inventors have realized by inventive and insightful reasoning, that the work area 205 may be increased substantially by using composite work areas, where a composite work area is defined as a continuous work area comprising at least two work areas 205', 205", each delimited by a boundary wire 250', 250" through which a control signal 245 is transmitted. The control signal 245 may be the same for both cables, or it may be different control signals 245', 245" for the different boundary wires 250', 250".

The plurality—at least two—boundary wires 250', 250" thus form a common perimeter 270 for the composite work area 205.

As in FIG. 1 the charging station 210 has, or is coupled to, a signal generator 240 for providing a control signal 245 to be transmitted through the boundary wire 250. However, the signal generator according to the teachings herein is configured to transmit a control signal through a first boundary wire 250' and at least a second boundary wire 250". The control signal 245 transmitted through each cable may be a first control signal 245' for being transmitted through the first boundary wire 250' and a second control signal 245" for being transmitted through the second boundary wire 250".

The signal generator thus comprises a controller for generating at least one control signal 245. The control signal(s) 245 comprises an alternating current, such as a continuously or regularly repeated current signal. The control signal may be a CDMA signal (CDMA—Code Division Multiple Access). The control signal may also or alternatively be a pulsed control signal, the control signal thus comprising one or more current pulses being transmitted periodically. The control signal may also or alternatively be a continuous sinusoidal wave.

In one embodiment the signal generator 240 comprises or is coupled to two pairs of contacts or terminals 241 and 242 for connecting the signal generator 240 to the at least two boundary wires 250', 250".

The robotic working tool system 200 thus comprises at least two boundary wires 250', 250" together forming a perimeter 270 delimiting a composite work area 205 comprising a first partial work area 205' and a second partial work area 205". In an embodiment where the first and second control signals 245', 245" differ, the robotic working tool 100 is configured to operate by detecting one or both of the two control signals 245', 245". As noted above the control signals may simply differ by one being a phase shifted version of the other.

In one embodiment the two boundary wires 250' and 250" are to be placed along each other at a common side between the two partial work areas 205' and 205". The distance marked d in FIG. 3 should thus be made small enough to be negligent with regards to the operation of the robotic working tool 100. What is considered to be negligent depends on the control system and speed of the robotic working tool 100 and a skilled person would understand what distance would be considered to be negligent for a given system. In one embodiment, the distance d between two adjacent boundary wires 250', 250" is less than the distance it takes for a robotic working tool to travel before reacting to a polarity change in the control signal. This enables the robotic working tool 100 to travel from one partial work area 205' to the second 205" without ever being outside a partial work area 205', 205" thus effectively remaining within the composite work area 205 at all times.

Examples of values for the distance d includes approximately 0 (in that the boundary wires are laid together which for practical purposes and limitations will result in a small variance along the wires extension), up to 1, up to 2, up to 3, up to 4, up to 5, up to 10, up to 15 and up to 20 cm.

In the area of two adjacent boundary wires 250', 250" the robotic working tool will pick up two control signals 245' and 245". The robotic working tool 100 will thus detect the first control signal 245' minus the second control signal 245" in the first partial work area 205' when being close to the common border, and detect the second control signal 245" minus the first control signal 245' in the second partial work area 205' when being close to the common border.

In an embodiment where the control signals are the same the two control signals will cancel each other in this area, and the robotic working tool 100 may not even detect the boundary wires as they are crossed when moving from one partial work area to another.

In an embodiment where the at least two control signals differ, the robotic working tool 100 is configured to operate according to both control signals 245', 245". For more complicated signals (such as CDMA) or other continuous signals) this means that the robotic working tool is effectively configured to operate according to at least four control signals, namely the first control signal 245', the second control signal 245", the first control signal minus the second control signal 245'-245" and the second control signal minus the first control signal 245"-245'.

Alternatively, the controller of the robotic working tool may be configured to split the detected magnetic field into components each component corresponding to one of the at least two control signals 245', 245".

The arrangement with composite work areas, where each partial work area is delimited by its own boundary wire has the benefit of increasing the total work area beyond that of the limitations set by the physical characteristics of the boundary wire and the ground. These limitations vary of course with the kind of signal, boundary wire and ground material/composition.

The arrangement also has the benefit of reducing the interference caused by the capacitance between the ground and the boundary wire and this may increase the workable length of the boundary wire for more complicated signals, being more sensitive to interference.

Utilizing the teachings herein it is thus possible to extend a work area 205, by making it a composite work area 205 comprising two or more adjacently placed work areas 205', 205" each being delimited by a boundary wire 250', 250" and the robotic working tool 100 being arranged to operate according to possibly several control signals at once, and in the case the control signals are different, being able to operate according to a sum of the control signals.

With regards to a robotic working tool being arranged to operate according to the sum of two (or more) control signals, the robotic working tool may be configured to operate by detecting and processing the sum of the two or more control signals as being one signal form. Alternatively or additionally, the robotic working tool may be configured to operate by detecting and processing the sum of the two or more control signals as being comprised of different signal forms by splitting up the detected sum signal into two or more components, a component possibly corresponding to a detected version of a control signal.

As discussed in the above, the control signals 245', 245" for each boundary wire 250', 250" may be of a continuous type or a discontinuous type. The control signals 245', 245" for each boundary wire 250', 250" may also or alternatively be of a pulsed type such as comprising one or more pulses appearing regularly, a complex coded type (such as CDMA—Code Division Multiple Access), a sinusoidal signal, a square wave signal. It should be noted that many control signal alternatives exist and the teachings herein should be regarded as including all.

The first control signal 245' for the first boundary wire 250' may be the same as the second control signal 245" for the second boundary wire 250". In such an embodiment, the control signals will cancel each other out in the area where they are adjacent one another and the robotic working tool may only need to be able to operate according to one control signal. No modifications are thus needed to the robotic working tool 100.

The first control signal 245' for the first boundary wire 250' may be the different to the second control signal 245" for the second boundary wire 250".

In one such embodiment, the control signals may differ by the second control signal 245" being a phase shifted version of the first control signal 245'. In such an embodiment the robotic working tool must be arranged to operate, i.e. detect, identify and determine inside/outside, according to both signals as in the area where they two boundary wires 250', 250" are adjacent one another and also in the surrounding area, the robotic working tool will detect two magnetic fields, one the inverted version of the other albeit phase shifted, and the robotic working tool 100 must be configured to distinguish this situation from when the robotic working tool 100 crosses a boundary cable. In such an embodiment, the robotic working tool 100 is thus configured to operate by judging that it is inside a composite work area as long as one of the two control signals 245', 245" is detected, but also if one and an inverted copy of the other are detected. Only if inverted copies of both control signals are detected, will the robotic working tool 100 decide that it is outside the work area 205. In such an embodiment, the robotic working tool 100 may also be configured to determine in which partial work area it is operating by determining which control signal is detected at the strongest amplitude.

An inverted signal is here seen as a signal whose polarity is opposite to that which is expected under normal installation and operation within the work area associated with the boundary wire through which the control signal is being transmitted.

In another such embodiment, the control signals may differ by the second control signal 245" being a different to the first control signal 245'. The robotic working tool 100 will then have to be able to detect, identify and determine inside/outside for one of the control signals, and also for the sum of the control signals, where one of the control signals is inverted. This also applies if the control signals differ by one being a phase shifted version of the other, but when the signals are overlapping.

The charging station 210 may need some modification in that the signal generator 240 must be arranged to accommodate two boundary wires 250', 250". In a simplest embodiment the two boundary wires are simply spliced together at the signal generator being connected in parallel. In another embodiment, the boundary wires are connected to each a set of terminals 241, 242.

The signal generator 240 should also be arranged to provide more than one control signal, in the embodiments where the control signals differ. This may be done by using more than one signal generator or by using a signal generator capable of generating more than one control signal.

Figure 4A:
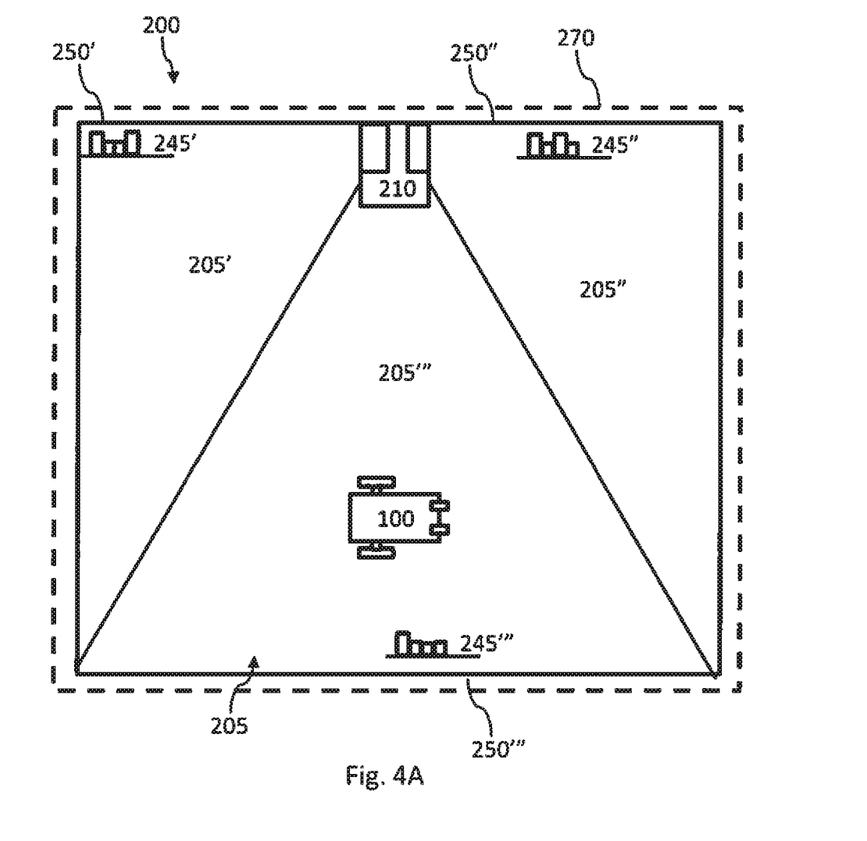
FIGS. 4A, 4B, 4C each shows a schematic overview of a robotic lawnmower system, such as that in FIG. 3 according to an embodiment of the teachings herein.
Figure 4B:
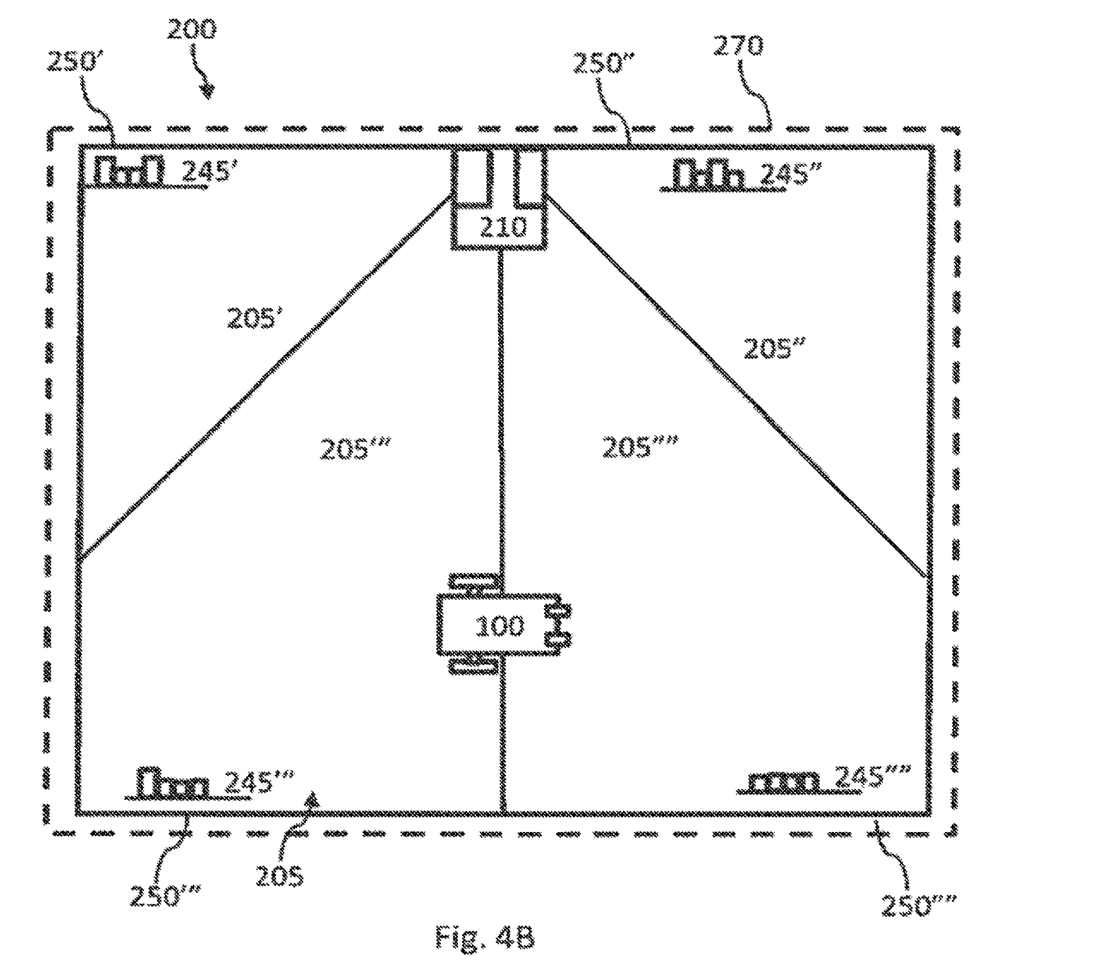
Figure 4C:
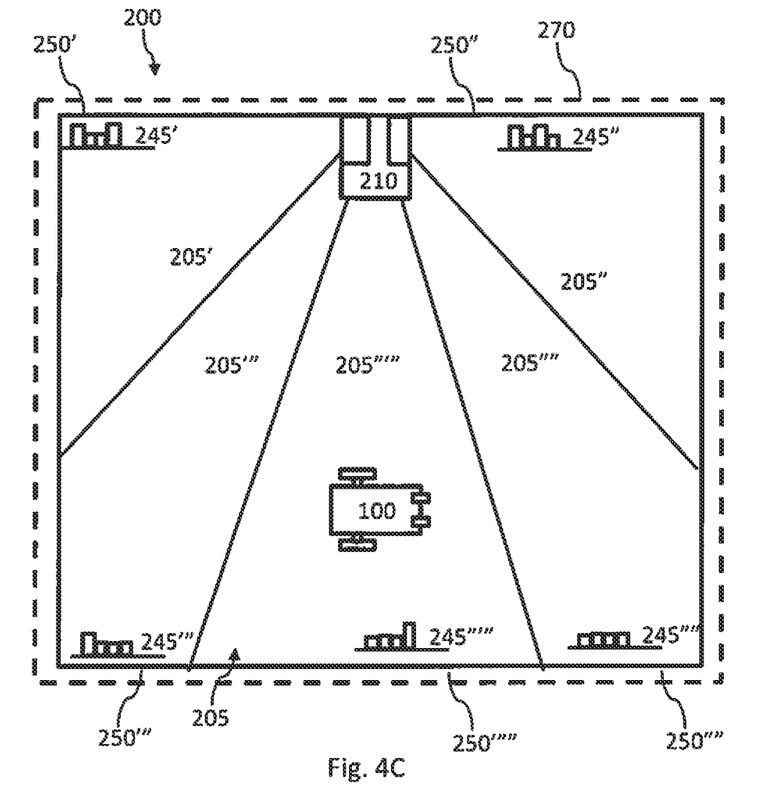

It should be noted that even though the robotic working tool system 200 discussed herein is discussed as having two partial work areas, even more work areas are possible. FIGS. 4A, 4B and 4C show some examples of topologies that may be used for providing extended composite work areas using multiple boundary wires, such as 3 in FIG. 4A, 4 in FIGS. 4B and 5 in FIG. 4C. Returning to FIG. 3, it should be noted that each partial work area 205', 205" or at least one of them, may be arranged with one or more additional wires 260' 260" such as guiding wires.

Figure 5:
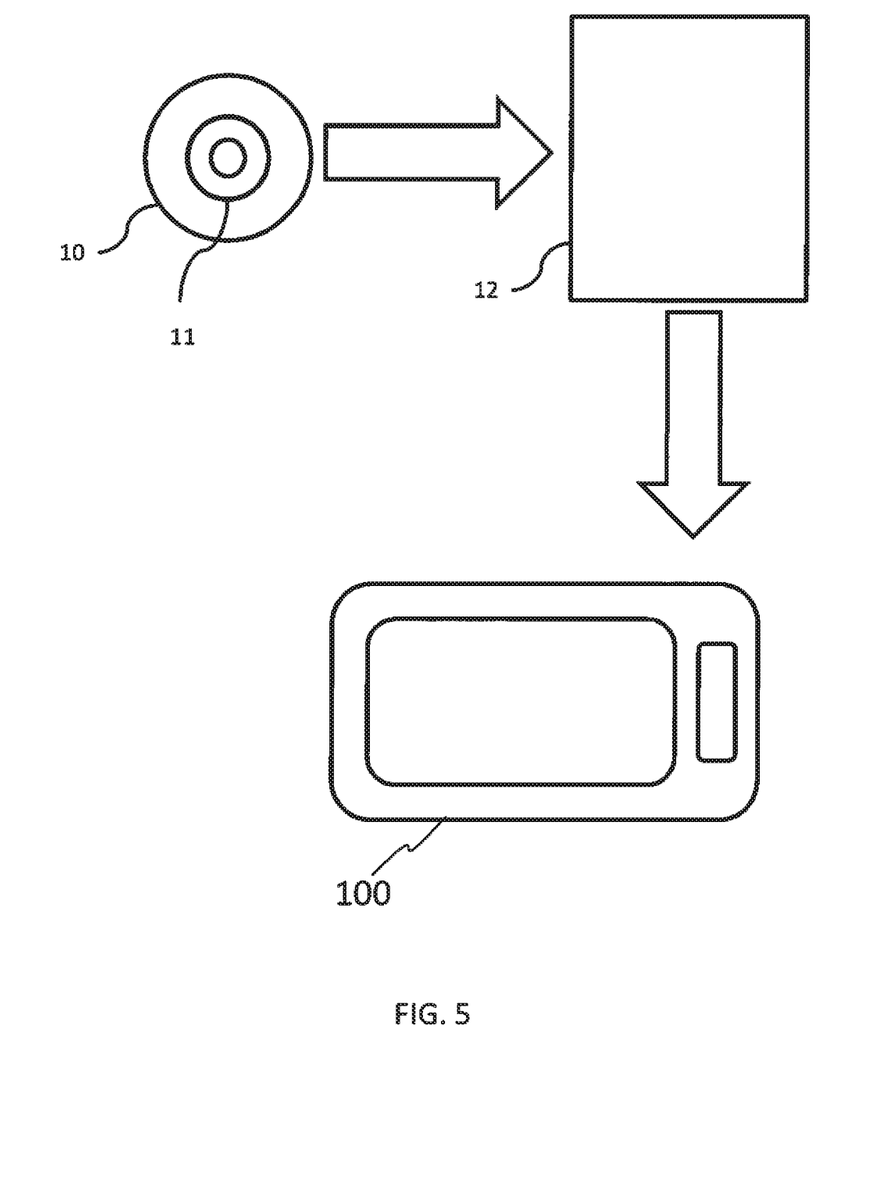
FIG. 5 shows a schematic view of a computer-readable medium carrying computer instructions according to an example embodiment of the teachings herein

It should be noted that as the robotic working tool 100 already includes all or at least most hardware components necessary to detect and operate according to multiple control signals, a simple software update may be sufficient to adapt an existing robotic working tool 100 to operate according to the teachings herein. Such software update may be provided by loading a set of computer instructions into the controller of the robotic working tool 100. Such computer instructions may be carried by a computer readable medium as shown in FIG. 5, which shows a schematic view of a computer-readable product 10 according to one embodiment of the teachings herein. The computer-readable product is configured to carry or store a computer program or computer program instructions 11 along with application related data. The computer-readable product 10 may be a data disc as in FIG. 5 or a Universal Serial Bus, a memory card or other commonly known computer readable products, these being examples of transitory mediums. The computer-readable product 10 may be inserted or plugged in or otherwise connected to a computer-readable product reader 12 configured to read the information, such as the program instructions 11 stored on the computer-readable product 12 and possibly execute the instructions or to connect to a device configured to execute the instructions such as a robotic working tool 100, as the one disclosed in FIGS. 2A and 2B. The robotic working tool 100 may thus connect wirelessly or through a wired connection to a computer-readable product reader 12 (this being an example of a non-transitory medium) to receive the computer instructions 11. The robotic working tool 100 may in one embodiment comprise the computer-readable product reader 12 to receive the computer instructions 11.

Figure 6:
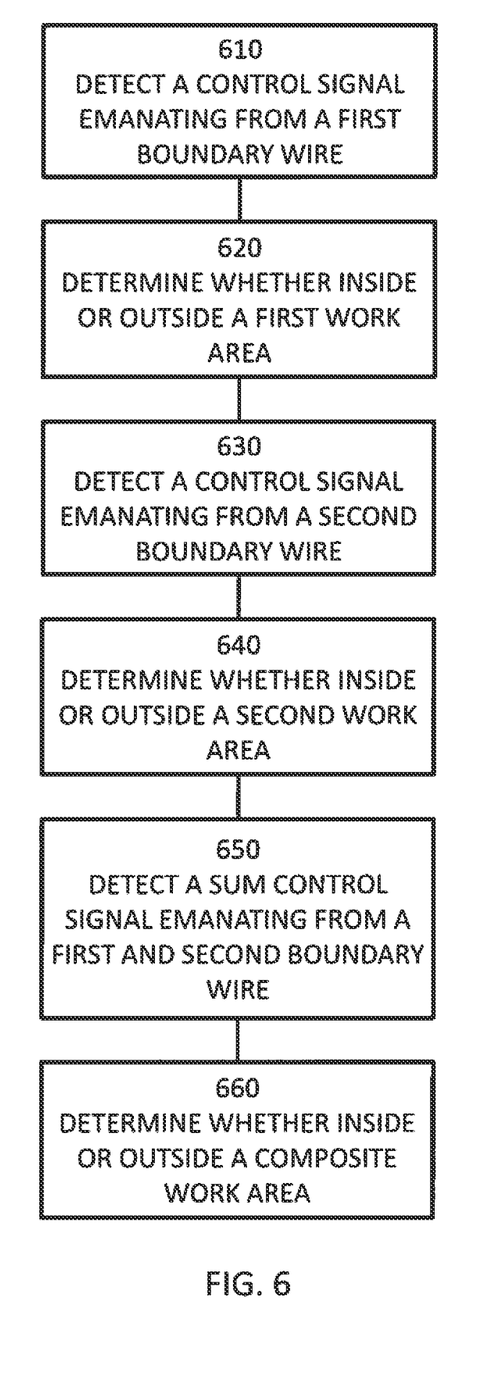
FIG. 6 shows a flowchart for a method for a robotic working tool according to art example embodiment of the teachings herein.
Figure 7:
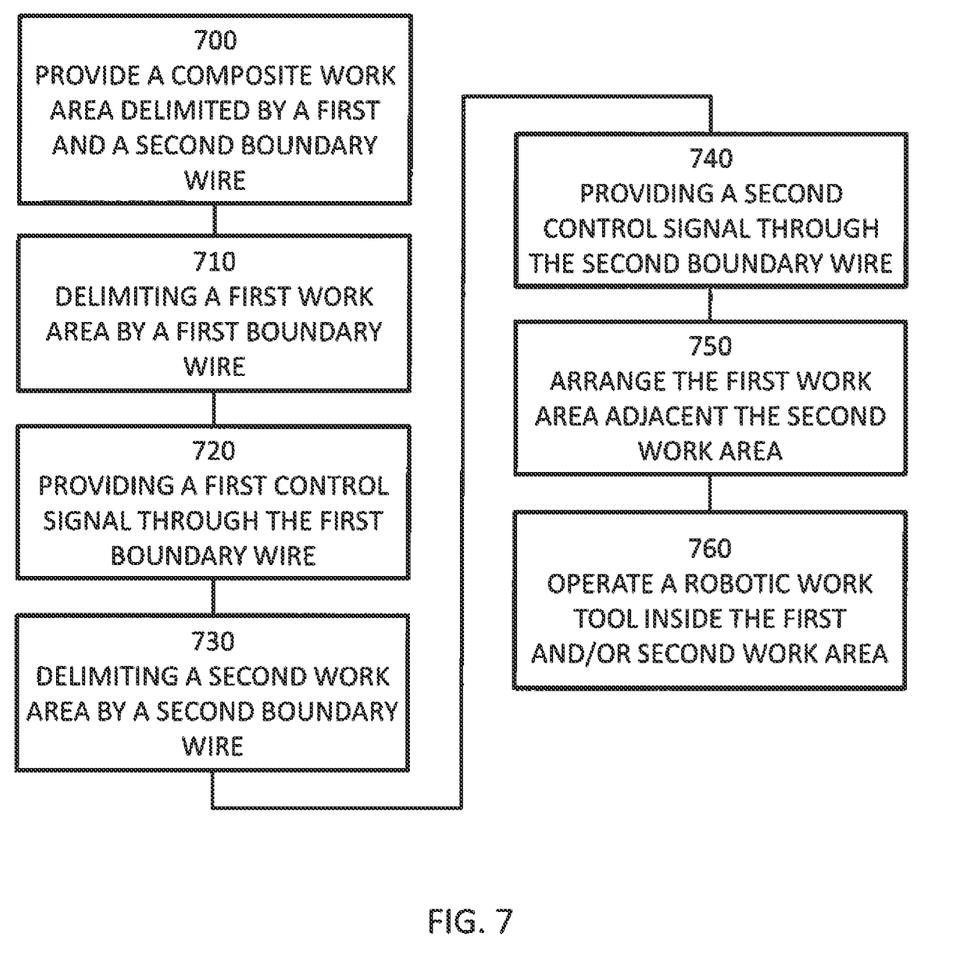
FIG. 7 shows a flowchart for a method for a robotic working tool system according to an example embodiment of the teachings herein.

When loaded into and executed by a controller the computer instructions may cause the robotic working tool 100 to operate according to a method as shown in FIG. 6 which shows a flowchart for a general method for a robotic working tool according to herein and cause the robotic working tool system 200 to operate according to a method as shown in FIG. 7 which shows a flowchart for a general method for a robotic working tool system according to herein.

The robotic working tool 100 is thus configured to perform a method comprising detecting 610 a first control signal 245' emanating from a first boundary wire 250', detecting 630 a second control signal 245" emanating from a first boundary wire 250' and/or detecting 650 a sum control signal 245'+245" emanating from a first boundary wire 250' and a second a first boundary wire 250", and in response thereto determine 660 whether the robotic working tool 100 is inside or outside a composite work area, comprising at least a first and a second work area, each delimited by the first and the second boundary wire respectively.

The robotic working tool may also be configured to perform this method by determining 620 whether the robotic working tool 100 is inside a first partial work area based on the detection of the first control signal (and/or based on the detection of the sum control signal). The robotic working tool 100 may be configured to determine that as it is inside a first partial work area, it is also within the composite work area. Similarly, the robotic working tool may also be configured to perform this method by determining 640 whether the robotic working tool 100 is inside a second partial work area based on the detection of the second control signal (and/or based on the detection of the sum control signal). The robotic working tool 100 may be configured to determine that as it is inside a second partial work area, it is also within the composite work area.

The determination whether inside or outside may be made by comparing the amplitude level of the detected control signal to a threshold value.

The determination whether inside or outside may also or alternatively be made by analyzing the polarity of the detected control signal. The analysis may be performed by comparing to a reference value.

It should be noted that the determination whether the robotic working tool is inside or outside the composite work area is not a straightforward detection as in the prior art. This is because the robotic working tool may sense the control signals from other partial work areas in for example the first work area. Especially when using more than two control signals as in FIGS. 4A, 4B and 4C.

The criteria for determining whether the robotic working tool is inside the composite work area may be defined as the robotic working tool being inside any of the partial work areas. However, the criteria for determining whether the robotic working tool 100 is outside the composite work area is not as straightforward to define as the opposite criteria (which would have been) that the robotic working tool is outside all partial work areas), as the robotic working tool may not be able to determine this as control signals from all partial work areas may not be received. The criteria for determining if the robotic working tool is outside the composite work area is thus defined as whether the robotic working tool is not inside any partial work area or if the robotic working tool is outside all detected partial work areas.

The controller is thus configured to determine that it is outside the composite work area, by determining that it is not inside any of the partial work areas for which a control signal is detected.

The robotic working tool 100 may be configured to determine that it is within a partial work area by determining that the detected control signal corresponding to the partial work area, and any sum control signal comprising the control signal of that partial work area, has a positive polarity. Positive polarity in this aspect being a polarity indicating an inside status.

The robotic working tool 100 may be configured to determine that it is outside the composite work area by determining that all detected control signals and sum signals indicate a negative polarity. Alternatively or additionally. The robotic working tool 100 may be configured to determine that it is outside the composite work area by determining that it is not inside any of the partial work areas.

A robotic working tool system 200 may be arranged to operate according to a method comprising delimiting 700 a composite work area by utilizing at least a first and a second boundary wire, not being connected in series, whereby the at least first and the second boundary wires constitute a common perimeter 270. The first boundary wire 250' is used to delimit 710 a first partial work area 205' through which a first control signal is provided 720 and the second boundary wire 250" is used to delimit 730 a second partial work area 205" through which a second control signal is provided 740 (the first control signal possibly being the same as the second control signal).

The two partial work areas are arranged adjacent one another so that a robotic working tool 100 may travel from one work area to the other.

The area where two work areas are adjacent one another, i.e. the area in between two adjacent work areas, may be formed as a corridor for enabling the robotic working tool 100 to travel from one work area to another.

It should be noted that even though the signal generator has been disclosed as a single device emitting more than one control signal the signal generator may be implemented as separate devices emitting one or more control signals each. However, for the concept of this application they will be regarded as one and the same unit.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic working tool comprising:
   a sensor configured to detect magnetic fields;
   a controller connected to the sensor, the controller being configured to control the robotic working tool to:
     operate according to a first control signal being transmitted through a first boundary wire, and
     operate according to a second control signal being transmitted through a second boundary wire;
   wherein the robotic working tool is thereby configured to operate within a composite work area comprising at least a first partial work area and a second partial work area;
   wherein the first boundary wire delimits the first partial work area and the second boundary wire delimits the second partial work area, the at least first and second boundary wires providing a common perimeter for the composite work area;
   wherein the controller is further configured to determine whether the robotic working tool is inside or outside the composite work area based on the first control signal, the second control signal, or a sum of the first control signal and the second control signal, wherein in the sum, one of the first and second control signals is inverted;
   wherein the controller is further configured to determine that the robotic working tool is inside the composite work area if the controller determines that the robotic working tool is inside at least one partial work area; and wherein the controller is further configured to determine that the robotic working tool is outside the composite work area if the controller determines that the robotic working tool is not inside at least one partial work area; and wherein the sensor is configured to detect magnetic fields around any of the first and second boundary wires, the magnetic fields being generated by the first control signal or the second control signal being transmitted through a respective one of the first and second boundary wires.

2. The robotic working tool according to claim 1, wherein the controller is further configured to determine whether the robotic working tool is inside or outside the composite work area based on polarities of the first control signal and the second control signal, wherein the controller determines that the robotic working tool is outside the composite work area if the polarities of both the first and second control signal are inverted compared to an expected polarity.

3. The robotic working tool according to claim 1, wherein the controller is further configured to determine that the robotic working tool is inside or outside the first partial work area based on the first control signal or a sum of the first control signal and the second control signal, wherein in the sum the second control signal is inverted, wherein the controller determines that the robotic working tool is outside the first partial work area if polarities of the first control signal are inverted or the sum is inverted compared to an expected polarity.

4. The robotic working tool according to claim 1, wherein the controller is further configured to determine that the robotic working tool is inside or outside the second partial work area based on the second control signal or a sum of the first control signal and the second control signal wherein sum includes the first control signal being inverted, wherein the controller determines that robotic working tool is outside the first partial work area if polarities of the second control signal are inverted or the sum is inverted compared to an expected polarity.

5. The robotic working tool according to claim 1, wherein the first and the second control signals are the same.

6. The robotic working tool according to claim 1, wherein the first and the second control signals are different.

7. The robotic working tool according to claim 6, wherein the second control signal is a phase shifted copy of the first control signal.

8. The robotic working tool according to claim 1, wherein the robotic working tool is a robotic lawnmower.

9. The robotic working tool according to claim 1, wherein the robotic working tool is arranged to operate according to a sum of two or more control signals, wherein the robotic working tool is configurable to operate by detecting and processing the sum of the two or more control signals as being one signal form or the robotic working tool being configurable to operate by detecting and processing the sum of the two or more control signals wherein the sum is comprised of different signal forms by splitting up a detected sum signal into a detected version of at least one of the two or more control signals.

10. A robotic working tool system comprising
a robotic working tool,
a first boundary wire,
a second boundary wire,
a signal generator for providing a first control signal through said first boundary wire and
a second control signal through said first boundary wire, wherein said robotic working tool is configured to operate in a composite work area, comprising a first partial work area delimited by the first boundary wire and a second partial work area delimited by the second boundary wire.

11. The robotic working tool system according to claim 10, wherein said composite work area is a continuous work area.

12. A method for use in a robotic working tool comprising a sensor for detecting magnetic fields and a controller for controlling the operation of the robotic working tool, the method comprising:
operating the robotic working tool according to a first control signal being transmitted through a first boundary wire; and
operating the robotic working tool according to a second control signal being transmitted through a second boundary wire, the robotic working tool thereby being configured to operate within a composite work area comprising at least a first partial work area and a second partial work area;
wherein the first boundary wire delimits the first partial work area and the second boundary wire delimits the second partial work area, the first and second boundary wires providing a common perimeter for the composite work area;
wherein the method further comprises:
determining whether the robotic working tool is inside or outside the composite work area based on the first control signal, the second control signal, or a sum of the first control signal and the second control signal, the sum including one of the first and second control signals being inverted;
wherein determining that the robotic working tool is inside the composite work area comprises determining that the robotic working tool is inside at least one partial work area; and
wherein determining that the robotic working tool is outside the composite work area comprises determining that the robotic working tool is not inside at least one partial work area; and
wherein the sensor is configured to detect magnetic fields around any of the first and second boundary wires, the magnetic fields being generated by the first control signal or the second control signal being transmitted through a respective one of the first and second boundary wires.

13. A non-transitory computer-readable product configured to carry computer program instructions that when loaded into and executed by a controller cause the controller to perform a method for use in a robotic working tool, the method comprising:
operating the robotic working tool according to a first control signal being transmitted through a first boundary wire; and
operating the robotic working tool according to a second control signal being transmitted through a second boundary wire, the robotic working tool thereby being configured to operate within a composite work area comprising at least a first partial work area and a second partial work area;
wherein the first boundary wire delimits the first partial work area and the second boundary wire delimits the second partial work area, the first and second boundary wires providing a common perimeter for the composite work area;

wherein the method further comprises:
   determining whether the robotic working tool is inside or outside the composite work area based on the first control signal, the second control signal, or a sum of the first control signal and the second control signal, the sum including one of the first and second control signals being inverted;
wherein determining that the robotic working tool is inside the composite work area comprises determining that the robotic working tool is inside at least one partial work area; and
wherein determining that the robotic working tool is outside the composite work area comprises determining that the robotic working tool is not inside at least one partial work area; and
wherein the sensor is configured to detect magnetic fields around any of the first and second boundary wires, the magnetic fields being generated by the first control signal or the second control signal being transmitted through a respective one of the first and second boundary wires.

\* \* \* \* \*